United States Patent
Twydell et al.

(10) Patent No.: US 6,716,885 B1
(45) Date of Patent: Apr. 6, 2004

(54) STORAGE-STABLE AERATED GEL COMPOSITION AND A PROCESS FOR PRODUCING IT

(75) Inventors: Roland Twydell, Widnes (GB); Lesley Le Quesne, Widnes (GB)

(73) Assignee: Sorex Limited, Widnes (GB)

( * ) Notice: Subject to any disclaimer, the term of this patent is extended or adjusted under 35 U.S.C. 154(b) by 0 days.

(21) Appl. No.: 10/130,052

(22) PCT Filed: Nov. 15, 2000

(86) PCT No.: PCT/GB00/04340

§ 371 (c)(1), (2), (4) Date: Sep. 10, 2002

(87) PCT Pub. No.: WO01/36084

PCT Pub. Date: May 25, 2001

(30) Foreign Application Priority Data

Nov. 18, 1999 (EP) .............................. 99309182

(51) Int. Cl.⁷ .................... B01J 13/00; C01B 33/18; C08J 3/05; C09K 3/00
(52) U.S. Cl. ................. 516/107; 252/194; 504/366; 514/944; 516/100; 516/108; 516/930; 524/916
(58) Field of Search ................. 516/100, 107, 516/108; 252/194; 526/916

(56) References Cited

U.S. PATENT DOCUMENTS

| | | | |
|---|---|---|---|
| 3,393,155 A | * 7/1968 | Schutte et al. | |
| 4,008,170 A | 2/1977 | Allan | ............ 252/194 |
| 4,274,883 A | 6/1981 | Lumbeck et al. | |
| 4,353,890 A | * 10/1982 | Scott | ............ 516/107 X |
| 4,755,377 A | * 7/1988 | Steer | ............ 516/107 X |
| 5,342,597 A | 8/1994 | Tunison, III | ............ 423/335 |

FOREIGN PATENT DOCUMENTS

| | | |
|---|---|---|
| CA | 1 197 273 A | 11/1985 |
| EP | 0 478 326 A1 | 4/1992 |
| FR | 1.438.271 | 7/1966 |

OTHER PUBLICATIONS

Database WPI, Section Ch, Derwent Publications Ltd., London, GB; AN 1970–41634R JP 45 016232 B (Koburu Laboratory KK) (abstract).
Database WPI, Section Ch, Derwent Publications Ltd., London, GB; AN 1970–31920R JP 45 012154 B (Koburu Laboratory) (abstract).
Database WPI, Section Ch, Derwent Publications Ltd., London, GB; AN 1971–31674S, JP 45 016947 B (Koburu Lab KK) (abstract).

* cited by examiner

*Primary Examiner*—Richard D. Lovering
(74) *Attorney, Agent, or Firm*—Edwards & Angell, LLP; Peter C. Lauro, Esq.

(57) ABSTRACT

A storage-stable aerated gel composition comprising 30 to 97% by weight of water, 0.2 to 5% by weight of a gelling agent selected from xanthan gum, sodium alginate and neutralized carboxyvinyl polymer and 2 to 5% by weight of a fine particulate hydrophobic silicone-treated silica having a surface area of from 80 to 300 $m^2/g$. The composition is in the form of fine particles of an aqueous gel containing the water and the gelling agent, the surface of which particles are coated with a coating of the finely divided particulate hydrophobic silica. The gel composition is prepared by mixing, under high shear conditions, the water and the fine particulate silica, and then adding to the resulting mixture, the gelling agent and mixing under high shear conditions.

20 Claims, No Drawings

STORAGE-STABLE AERATED GEL COMPOSITION AND A PROCESS FOR PRODUCING IT

This application is a 371 of PCT/GB 00/04340 filed Nov. 15, 2002.

The present invention relates to storage-stable aerated gel compositions. It also relates to a process for making such compositions. In particular, the gel compositions contain a particular hydrophobic silica, water and gelling agent.

Aqueous dispersions of silica can be prepared into a state known generally in the prior art as "dry water". In fact "dry water" is known in two forms. The first form can be produced by absorbing aqueous liquids onto hydrophilic material to form a material which exists as free-flowing powder or granules. The second form can be produced by coating finely divided aqueous liquids with powdered hydrophobic material, such as metal oxides. Each liquid particle in this second form of "dry water" is separated from the next by a hydrophobic metal oxide coating and by air spaces. Very high speeds of, for example, over 6000 rpm, and mixing times of 15 minutes are typically required. This second form is, however, thermodynamically unstable and, when produced, tends to break down after a relatively short period of time.

The present invention is based on the discovery that stable aerated gels analogous to this second form of "dry water" can be produced.

The present invention provides a storage-stable aerated gel composition comprising 30 to 97% by weight of water, 0.2 to 5% by weight of a gelling agent selected from xanthan gum, sodium alginate and neutralised carboxyvinyl polymer and 2 to 5% by weight of a fine particulate, hydrophobic silicone-treated silica having a surface area of from 80 to 300 $m^2/g$ which said composition is in the form of fine particles of an aqueous gel containing the water and gelling agent, the surfaces of which fine particles are coated with a coating of the finely particulate hydrophobic silica.

The present invention further provides a process for producing a storage-stable aerated gel composition which comprises the steps of mixing, under high shear conditions, from 2 to 5% by weight of a finely particulate, hydrophobic silicone-treated silica having a surface area of from 80 to 300 $m^2/g$ and from 30 to 97% by weight of water, adding to the resulting mixture from 0.2 to 5% by weight of a gelling agent selected from xanthan gum, sodium alginate and neutralised carboxyvinyl polymer and mixing the gelling agent with the silica-water mixture under conditions of high shear.

A discovery on which the present invention is based lies in the use of certain gelling agents which, when added to a premix formed by mixing the water and a specific type of hydrophobic silica under high shear conditions and then mixed with the premix also under high shear conditions, give a storage-stable aerated get composition. Many conventional gelling agents which are ordinarily used to gel aqueous systems do not produce storage-stable gel compositions according to the present invention. The reasons for this are not, at present, understood. Furthermore, by adjusting the components used in the present invention the structure of the gel composition produced can be varied from a free-flowing pulverulent fluid composition which may have applications using conventional spray or dusting equipment to a non-flowing composition which may have applications as a caulking material.

Where the words "comprises" or "comprising" are used herein, it is intended that these may have the meaning "includes" and "including", respectively, to the extent that the presence of one or more other materials is not excluded.

The composition of the present invention comprises a fine particulate hydrophobic silicone-treated silica having a surface area of from 80 to 300 $m^2/g$. By the term "fine particulate", as applied to the hydrophobic silica, it is meant that the hydrophobic silica will typically have an average particle size of less than 40 $\mu$m. The silica used is one that has been rendered hydrophobic by surface treatment using one or more organosilicon compounds to produce, on the silicon dioxide surface, silicone groups. The technique of hydrophobicizing silica in this way is well-known and such silicone-treated silica is available commercially. We have found that good results are obtained by using hydrophobic silica marketed under the name CAB-O-SIL ("CAB-O-SIL" is a trademark of Cabot Corporation), preferably CAB-O-SIL TS720. However, other silicone-treated silicas can also be used in the present invention if they have a surface area within the range of from 80 to 300 $m^2/g$. The hydrophobic silica may also be one that has been surface treated to produce siloxane, as well as, silicone groups attached to the silicon dioxide surface.

The hydrophobic silica is used in an amount of from 2 to 5% by weight based on the total weight of the composition. The use of greater than 5% by weight of the hydrophobic silica results in a gel composition which is excessively dusty. The use of such a composition may give rise to a greater nuisance dust risk. Preferably, the amount of hydrophobic silica will be in the range of from 3 to 4% by weight of the composition.

The water used may typically be tap water although purified grades may be appropriate for some applications. The water will normally be used at ambient temperature since there appears to be no advantage in using heated or cooled water in the performance of the invention. The water generally will form from 30 to 97% by weight of the total composition. Preferably, however, the amount of water will be from 90 to 97% by weight to ensure the formation of aerated gel compositions of good consistency and improved stability.

As mentioned above, the gelling agent is one or more selected from xanthan gum, sodium alginate and neutralised carboxyvinyl polymers, such as carboxypolymethylene neutralised with triethanolamine. These gelling agents are included in an amount of from 0.2 to 5% by weight. The use of an amount greater than 5% by weight of the gelling agent results in a gel composition having an excessively high gel strength. Preferably, from 0.5% to 2% by weight of the gelling agent will be used depending on the desired stability and structure of the gel composition. Other hydrophilic or hydrophobic additives, known to those skilled in the art may be incorporated to modify the physical or biological properties of the composition.

The process for producing the gel compositions involves mixing the water with the silica under high shear conditions typically for a few minutes, for example 2 to 5 minutes. The mixing at this stage in the process must be carried out under high shear conditions, i.e., conditions which cause the water to be finely fragmented into minute droplets which become dispersed within the finely particulate hydrophobic silica such that the surfaces of the water droplets become coated with the hydrophobic silica particles. The term "high shear" is, of course, well-known to the person skilled in the art of mixing or blending and whether or not a particular mixing apparatus is capable of mixing aqueous compositions under high shear conditions will be known to one skilled in the art. This may be achieved by using standard high speed mixers, typically using a mixing speed of at least 2000 rpm and generally from 2000 to 3000 rpm. After the hydrophobic silica and the water have been mixed to create a dispersion of fine droplets of water in the silica, the gelling agent is added and mixing at high speed is continued for several minutes until the gelling agent has been thoroughly incorporated into the liquid phase. It is preferred in the present invention to add the gelling agent after the silica and water have been thoroughly mixed together. If the gelling agent is added before the silica, mixing requires more energy and the homogeneity and stability of the resulting gel composition can be compromised.

The storage-stable aerated gel compositions of the present invention can be used in sprayable formulations produced for domestic, veterinary, agricultural or horticultural applications.

The invention will now be illustrated by the following examples in which the compositions in Examples 1 to 3 and 5 to 7 were mixed using an IKA RE166 high speed mixer having a radial flow toothed disc mixer head and the composition in Example 4 was mixed using a larger scale Torrance high speed mixer having a radial flow toothed disc mixer head.

EXAMPLE 1

Cold tap water 95.5 g was mixed with 3 g of CAB-O-SiL TS720 (silica) at 2800 rpm on the laboratory mixer for 2 minutes. "Dry water" was not formed. Powdered xanthan gum 1.5 g was added and the mixer speed increased to 5500 rpm for a further 3 minutes. A free-flowing aerated gel was formed with a density of 0.6 g/ml. No water separated on storage at laboratory ambient (max/min 30/8° C.) at 24 weeks.

EXAMPLE 2

Cold tap water 96.5 g was mixed with 3 g of CAB-O-SIL TS720 at 2800 rpm on the laboratory mixer for 2 minutes. "Dry water" did not form. Powdered xanthan gum 0.5 g was added and the mixer speed increased to 5500 rpm for a further 3 minutes. A free-flowing aerated gel was formed similar in appearance to that formed in Example 1. The gel composition formed in this Example could be syringed through a 0.26 mm internal diameter needle but blocked a 0.21 mm internal diameter needle.

EXAMPLE 3

Using a larger mixing vessel with the laboratory mixer 1930 g of cold tap water, 60 g of CAB-O-SIL TS720 and 10 g of powdered xanthan gum were mixed by the same process as described in Example 2. The product was identical to that produced in Example 2. A 1 liter sample was transferred to a 2 liter PET bottle and held under 1.7 bar pressure. This sample remained stable with no water separation for greater than 31 days stored at ambient temperature. Some water separation was noted after 59 days under continuous pressure. The sample was easily re-homogenised by 5 vigorous inversions and no further water separated until 16 hours later.

EXAMPLE 4

Cold tap water 77.2 kg was mixed with 2.4 kg of CAB-O-SIL TS720 on the production mixer at 2500 rpm for 1 minute. "Dry water" did not form. Powdered xanthan gum 0.4 kg was added and mixing continued at the same speed for a further 10 minutes. The product was a free-flowing aerated gel as in Examples 1 to 3. Six further 80 kg batches were made by the same process and recipe without variation in the product. A sample of this product 8.6 kg was packed into a polypropylene bucket with a tightly fitting lid. This sample was transported in a car for 2022 miles over a duration of 6 weeks. No water separation occurred during this period. At 14 weeks there was 4.7% m/m water separation. Further samples from these production batches were applied as a "wet dust" through a GLORIA 2010 Knapsack sprayer at 2 to 4 bar pressure fitted with a TEEJET 65030E brass nozzle. The nozzle filter was removed for these applications. A total of 115 liters of dry gel were applied through this knapsack sprayer without blockage. Further samples were applied as a “wet dust” through a STIHL SR400 motorised mistblower fitted with a pressure pump. The tank filter was removed and the standard adjustable spray nozzle was retained for these applications. A total of 250 liters of dry gel was applied through this mistblower at a nozzle setting of 3 to 4 without blockage.

EXAMPLE 5

Cold tap water 76.5 g, propylene glycol 20 g and 3 g of CAB-O-SIL TS720 were mixed on the laboratory mixer at 2800 rpm for 2 minutes. “Dry water” did not form. Powdered xanthan gum 0.5 g was added and the mixing speed increased to 5500 rpm for a further 3 minutes. The product was a free-flowing aerated gel of a wetter consistency than in Examples 1 to 4. No water separation occurred after 5 days ambient storage.

EXAMPLE 6

Cold tap water 96.3 g and CARBOPOL 980® (registered trademark of BF Goodrich Co.) 0.5 g (a carboxyvinyl polymer) were mixed on the laboratory mixer at 2800 rpm for 1 minute. CAB-O-SIL TS720 3 g was added and mixed at the same speed for a further 2 minutes. “Dry water” did not form. Triethanolamine 0.2 g was added to neutralise the CARBOPOL and the mixing speed increased to 5500 rpm for a further 3 minutes. A thick pliable aerated dry gel was formed that could be easily extruded through a 30 ml plastic syringe. No water separation occurred after 13 weeks ambient storage.

EXAMPLE 7

Cold tap water 96 g and 3 g of CAB-O-SIL TS720 were mixed on the laboratory mixer at 2800 rpm for 2 minutes. “Dry water” did not form. Sodium alginate, high viscosity grade, 1 g (a polysaccharide) was added and the mixing speed increased to 5500 rpm for a further 3 minutes. A free-flowing aerated gel was initially formed which thickened to a non-flowing gel after 5 days. The gel remained pliable and could easily be extruded from a 30 ml plastic syringe. No water separation occurred after 6 days ambient storage.

What is claimed is:

1. A storage-stable aerated gel composition comprising 30 to 97% by weight of water, 0.2 to 5% by weight of a gelling agent selected from the group consisting of xanthan gum, sodium alginate and neutralised carboxyvinyl polymer and 2 to 5% by weight of a fine particulate, hydrophobic silicone-treated silica having a surface area of from 80 to 300 $m^2/g$ which said composition is in the form of fine particles of an aqueous gel containing the water and gelling agent, the surfaces of which fine particles are coated with a coating of the finely particulate hydrophobic silica.

2. A composition according to claim 1 comprising from 3 to 4% by weight of the silica.

3. A composition according to claim 1 comprising from 90 to 97% by weight of water.

4. A composition according to claim 3 comprising from 3 to 4% by weight of the silica.

5. A process for producing the storage-stable aerated gel composition which comprises the steps of mixing, under high shear conditions, from 2 to 5% by weight of a fine particulate, hydrophobic silicone-treated silica having a surface area of from 80 to 300 $m^2/g$ and from 30 to 97% by weight of water, adding to the resulting mixture from 0.2 to 5% by weight of a gelling agent selected from the group consisting of xanthan gum, sodium alginate and neutralised carboxyvinyl polymer and mixing the gelling agent with the silica-water mixture under conditions of high shear.

6. A process according to claim 5, further comprising mixing the gelling agent with the silica and the water at a mixing speed of 5000 to 6000 rpm.

7. A process according to claim 5, further comprising mixing together the water and the silica at a mixing speed in the range of 2000 to 3000 rpm.

8. A process according to claim 7, further comprising mixing the gelling agent with the silica and the water at a mixing speed of from 5000 to 6000 rpm.

9. A process according to claim 5, wherein the gelling agent is xanthan gum.

10. A process according to claim 9, further comprising mixing together the water and the silica at a mixing speed in the range of 2000 to 3000 rpm.

11. A process according to claim 9, further comprising mixing the gelling agent with the silica and the water at a mixing speed of from 5000 to 6000 rpm.

12. A process according to claim 5, wherein the silica is used in an amount of 3 to 4%.

13. A process according to claim 12, wherein the gelling agent is xanthan gum.

14. A process according to claim 12, further comprising mixing together the water and the silica at a mixing speed in the range of 2000 to 3000 rpm.

15. A process according to claim 12, further comprising mixing the gelling agent with the silica and the water at a mixing speed of from 5000 to 6000 rpm.

16. A process according to claim 5, wherein the water is used in an amount of from 90 to 97% by weight.

17. A process according to claim 16, wherein the silica is used in an amount from 3 to 4%.

18. A process according to claim 16, wherein the gelling agent is xanthan gum.

19. A process according to claim 16, further comprising mixing together the water and the silica at a mixing speed in the range of 2000 to 3000 rpm.

20. A process according to claim 16, further comprising mixing the gelling agent with the silica and the water at a mixing speed of from 5000 to 6000 rpm.

* * * * *